US009764470B2

(12) United States Patent
Saboo et al.

(10) Patent No.: US 9,764,470 B2
(45) Date of Patent: Sep. 19, 2017

(54) SELECTIVE DEPLOYMENT OF ROBOTS TO PERFORM MAPPING

(71) Applicant: X Development LLC, Mountain View, CA (US)

(72) Inventors: Rohit Ramesh Saboo, Mountain View, CA (US); Julian MacNeille Mason, Redwood City, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 45 days.

(21) Appl. No.: 14/875,648

(22) Filed: Oct. 5, 2015

(65) Prior Publication Data

US 2017/0095926 A1    Apr. 6, 2017

(51) Int. Cl.
G06F 19/00 (2011.01)
B25J 9/16 (2006.01)
B25J 9/00 (2006.01)

(52) U.S. Cl.
CPC ........... B25J 9/1664 (2013.01); B25J 9/0084 (2013.01); *Y10S 901/01* (2013.01); *Y10S 901/46* (2013.01)

(58) Field of Classification Search
CPC ..... B25J 9/1664; B25J 9/0084; Y10S 901/46; Y10S 901/01
USPC .................................................. 700/245, 248
See application file for complete search history.

(56) References Cited

U.S. PATENT DOCUMENTS 6,324,476 B1 * 11/2001 Trovato ................. B25J 9/1666
700/245
2002/0018449 A1    2/2002 Ricciulli 2005/0238200 A1 * 10/2005 Gupta ................ G06K 9/00201
382/103
2008/0046125 A1 *  2/2008 Myeong ............... G05D 1/0219
700/253
2008/0059015 A1 *  3/2008 Whittaker .............. G05D 1/027
701/23
2009/0182464 A1 *  7/2009 Myeong ............... G05D 1/0246
701/25
2010/0070078 A1 *  3/2010 Kong ................... G05D 1/0274
700/259

(Continued)

FOREIGN PATENT DOCUMENTS

JP         2005032196         2/2005

OTHER PUBLICATIONS

Mansley, C. et al. (May 2011). Robotic Mapping and Monitoring of Data Centers. In Robotics and Automation (ICRA), 2011 IEEE International Conference on (pp. 5905-5910). IEEE.

(Continued)

*Primary Examiner* — Jaime Figueroa
(74) *Attorney, Agent, or Firm* — Middleton Reutlinger (57) ABSTRACT

Methods, apparatus, systems, and computer-readable media are provided for selectively deploying robots to performing mapping based on added cost. In various implementations, a measure of interest in mapping an area of an environment may be determined. A cost associated with a robot performing a task may also be determined. Then, an added cost associated with the robot mapping the area of the environment while performing the task may be determined. The robot may be selectively deployed to map the area while performing the task in response to a determination that the measure of interest justifies the added cost.

20 Claims, 7 Drawing Sheets

(56) References Cited

U.S. PATENT DOCUMENTS

| | | | | |
|---|---|---|---|---|
| 2010/0082194 A1* | 4/2010 | Yabushita | ............ | G06Q 10/047 |
| | | | | 701/25 |
| 2010/0211244 A1* | 8/2010 | Jeong | ..................... | G01C 21/20 |
| | | | | 701/25 |
| 2010/0324771 A1* | 12/2010 | Yabushita | .............. | G05D 1/024 |
| | | | | 701/25 |
| 2012/0035797 A1* | 2/2012 | Oobayashi | ........... | G05D 1/0214 |
| | | | | 701/23 |
| 2012/0166019 A1* | 6/2012 | Anderson | ............ | G05D 1/0219 |
| | | | | 701/1 |
| 2013/0116819 A1* | 5/2013 | Ikeda | .................. | G06F 17/5009 |
| | | | | 700/245 |
| 2014/0122409 A1 | 5/2014 | Na et al. | | |
| 2015/0197010 A1 | 7/2015 | Ruuspakka et al. | | |

OTHER PUBLICATIONS

Guez, A., & Pineau, J. (May 2010). Multi-tasking SLAM. In Robotics and Automation (ICRA), 2010 IEEE International Conference on (pp. 377-384). IEEE.

International Search Report and Written Opinion of PCT Ser. No. PCT/US16/55183 Jan. 9, 2017.

* cited by examiner

SELECTIVE DEPLOYMENT OF ROBOTS TO PERFORM MAPPING

BACKGROUND

Autonomous and semi-autonomous robots often may be deployed in environments that are inadequately mapped. Many such robots may be configured to perform various techniques, including but not limited to simultaneous localization and mapping ("SLAM"), to learn more about the environment. Having this information may enable the robots to perform various tasks safely and/or efficiently. However, map data obtained by one or more robots performing SLAM or other similar techniques in dynamic environments may become stale over time. Additionally, some areas of an environment may be more dynamic and/or mission-critical than others, and thus may warrant heightened interest in mapping and/or re-mapping.

SUMMARY

The present disclosure is generally directed to methods, apparatus, and computer-readable media (transitory and non-transitory) for selectively deploying robots to perform tasks (e.g., as "primary tasks") that are otherwise unrelated to mapping in manners that also enable the robots to perform (e.g., as "secondary tasks") mapping (e.g., SLAM) of areas of heightened interest. For example, one or more costs associated with deploying one or more robots to perform one or more primary tasks may be determined. Then, one or more added costs for the one or more robots to map an area of interest while performing the primary task may be determined. For example, how much extra would it cost to divert the robot from a shortest path required to perform its primary task along a longer path that enables the robot to map an area of interest? If, for any of the one or more robots, a measure of interest in mapping the area justifies the added cost for that robot to map the area while performing its primary task, that robot may be considered for deployment to perform its primary task in a manner that also enables the robot to map the area. If more than one robot would be justified in mapping the area while performing its respective primary task, then in implementations the robot for which the added cost would be lowest may be deployed.

In some implementations, a method may be provided that includes: determining, by one or more processors, a measure of interest in mapping an area of an environment; determining, by the one or more processors, a cost associated with a robot performing a task; determining, by the one or more processors, an added cost associated with the robot mapping the area of the environment while performing the task; and deploying, by the one or more processors, the robot to map the area while performing the task in response to a determination that the measure of interest justifies the added cost.

This method and other implementations of technology disclosed herein may each optionally include one or more of the following features.

In various implementations, determining a measure of interest may include determining a rate of change of the area, wherein a greater rate of change of the area corresponds to a greater measure of interest in mapping the area. In various implementations, determining a measure of interest may include determining a measure of uncertainty about the area, wherein a greater measure of uncertainty corresponds to a greater measure of interest in mapping the area. In various implementations, determining a measure of interest may include determining how recently the area has been mapped, wherein a greater amount of time since the area has been mapped corresponds to a greater measure of interest in mapping the area. In various implementations, determining a measure of interest may include determining a measure of data connectivity in the area, wherein the measure of data connectivity is inversely related to the measure of interest in mapping the area.

In various implementations, the added cost may be determined based at least in part on one or more attributes of the robot. In various implementations, the one or more attributes of the robot may include a measure of criticality associated with the robot. In various implementations, the one or more attributes of the robot may include a measure of demand associated with the robot. In various implementations, the added cost may be determined based at least in part on a measure of importance associated with the task. In various implementations, the added cost may be determined based at least in part on an impact mapping the area will have on a subsequent task assigned to the robot.

In various implementations, the task may be a first task, the cost may be a first cost for the robot to perform the first task, the added cost may be a first added cost, and the method may further include: determining, by the one or more processors, a second cost associated with a second robot performing a second task; determining, by the one or more processors, a second added cost associated with the second robot mapping the area of the environment while performing the second task; comparing, by the one or more processors, the first added cost to the second added cost; and selectively deploying, by the one or more processors, the first or second robot to map the area based on a result of the comparing.

Other implementations may include a non-transitory computer readable storage medium storing instructions executable by a computing system and/or one or more processors to perform a method such as one or more of the methods described above. Yet another implementation may include a system, such as a robot or robot management system, that includes memory and logic operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
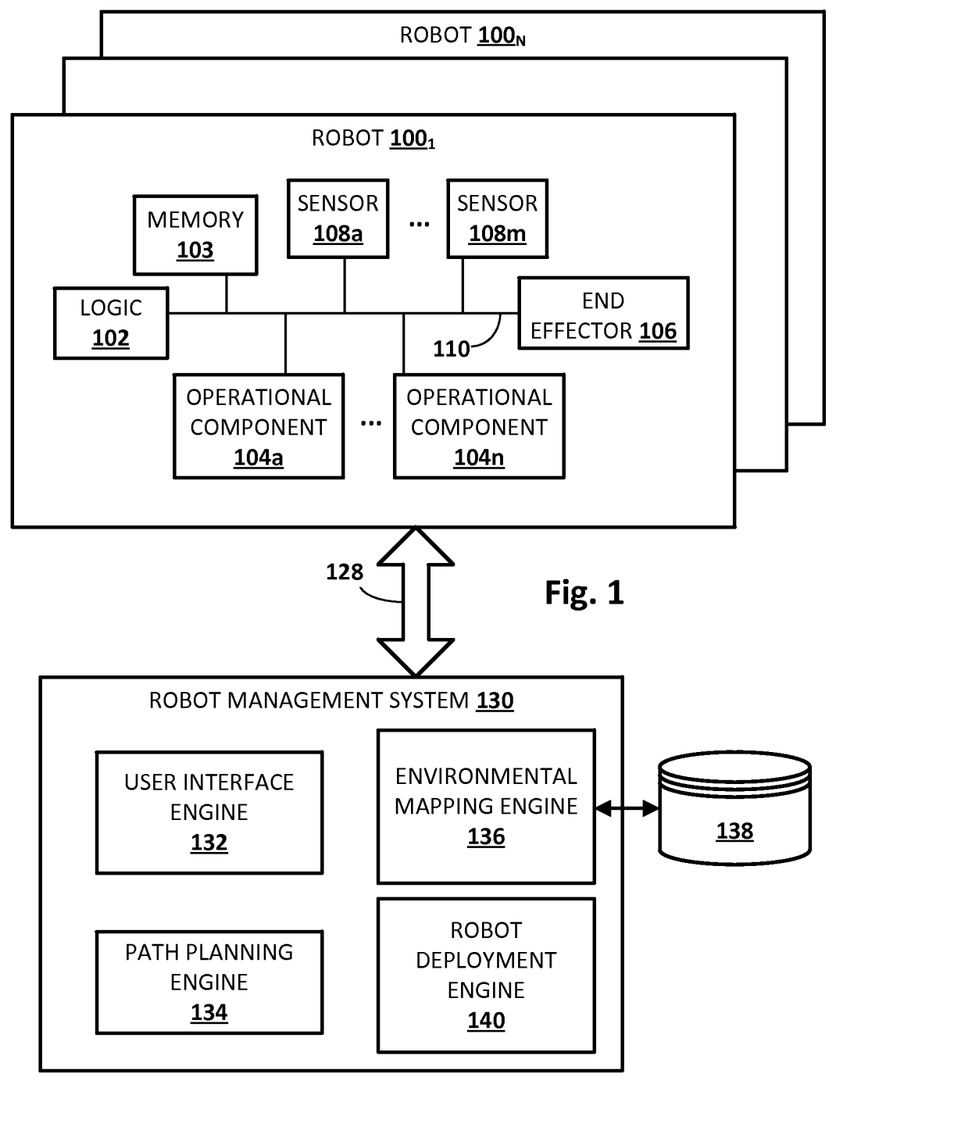
FIG. 1 schematically depicts an example environment in which disclosed techniques may be implemented, in accordance with various implementations.

FIG. 1 schematically depicts an example environment in which disclosed techniques may be implemented to selectively deploy one or more at least semi-autonomous robots $100_{1-N}$ to map areas of potential interest while performing primary tasks, in accordance with various implementations. Each of robots $100_{1-N}$ may take various forms, including but not limited to a telepresence robot, a robot arm, a humanoid, an animal, an insect, an aquatic creature, a wheeled device (e.g., such as a robot forklift depicted in various figures herein), a submersible vehicle, an unmanned aerial vehicle ("UAV"), and so forth. Each robot may include logic 102 operably coupled to memory 103 (e.g., RAM, ROM, DRAM, flash, etc.), one or more operational components 104*a-n*, one or more end effectors 106, and one or more sensors 108*a-n* via one or more buses 110. Logic 102 may, in various implementations, include one or more processors, such as one or more so-called "real time processors" that are guaranteed to perform various operations within various temporal constraints.

As used herein, "operational components" 104 of a robot may refer to actuators, motors (e.g., servo motors), joints, shafts, gear trains, wheels, tracks, pumps (e.g., air or liquid), pistons, drives, or other components that may create and/or undergo propulsion, rotation, and/or motion to move components of robot 100 relative to each other, and/or to move robot 100 as a whole. Some operational components may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with various types of "grippers," including but not limited to "impactive" (e.g., "grab" objects using opposing digits), "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. Of particular interest in a warehouse context, robot forklifts may include one or more horizontal arms that may be inserted into pallets and then lifted, thereby lifting the pallet (and any contents stacked on the pallet). The robot forklift may then carry the pallet and its contents to a desired location.

Sensors 108 may take various forms, including but not limited to cameras, light sensors (e.g., passive infrared), pressure sensors, pressure wave sensors (e.g., microphones), proximity sensors, torque sensors, force sensors, radars, range finders, accelerometers, gyroscopes, compasses, position coordinate sensors (e.g., global positioning system, or "GPS"), speedometers, drop off sensors (e.g., to detect an edge of a raised surface), and so forth. While sensors 108*a-m* are depicted as being integral with robot 100, this is not meant to be limiting. In some implementations, sensors 108 may be located external to, but may be in direct or indirect communication with, robot 100, e.g., as standalone units or as part of a robot management system 130. Some of the aforementioned sensors may be installed on robots $100_{1-N}$ so that robots $100_{1-N}$ may perform various map data gathering techniques, such as simultaneous localization and mapping ("SLAM"), to obtain information about an environment in which they operate.

Robots $100_{1-N}$ may be controlled, managed, and/or selectively deployed to various degrees by robot management system 130. Robots $100_{1-N}$ and robot management system 130 may communicate via one or more wired (e.g., Ethernet) or wireless (e.g., Wi-Fi, cellular, WiMAX, Bluetooth, proprietary, etc.) communication channels 128. Robot management system 130 may include one or computing systems connected by one or more networks (not depicted) that control and/or manage operation of robots $100_{1-N}$ to various degrees. An example of such a computing system is depicted schematically in FIG. 7. In some implementations, these multiple computing systems may cooperate to provide a so-called "cloud" that, in effect, combines computing resources of each computing system into a pool, enabling more powerful and/or more data-intensive processing. Various modules or engines may be implemented as part of robot management system 130 as software, hardware, or any combination of the two. For example, in FIG. 1, robot management system 130 includes a user interface engine 132, a path planning engine 134, an environmental mapping engine 136, and robot deployment engine 136.

User interface engine 132 may be configured to receive, as input, commands from various sources, such as human technicians. User interface engine 132 may provide or otherwise make this input available to other components of robot management system 130. Additionally or alternatively, user interface engine 132 may provide one or more user interfaces, locally and/or distributed to remote computing devices (e.g., as interactive web pages), which may be operated by users such as technicians to perform various tasks, such as control robots $100_{1-N}$, provide input indicative of obstacles or hazards for environmental mapping engine 136, and/or adjust various parameters related to path planning engine 134 and/or robot deployment engine 140.

Path planning engine 134 may be configured to calculate a robot path based on a variety of constraints associated with a robot 100 and/or a so-called "primary" task assigned to the robot 100, such as a starting point, an end point, desired task duration, associated kinematic constraints, etc. "Tasks" as used herein may refer to any number of operations, combinations of operations, and/or sequences of operations that may be performed by a robot. A primary task may be relatively simple, e.g., travel from point A to point B, follow person X, etc., or relatively complex, e.g., obtain object from location A, then manipulate or alter object, then travel to location B, then drop off object at location B, and then return to location A.

Path planning engine 134 may be further configured to plan robot paths based on information it learns, e.g., from environmental mapping engine 136, about an environment in which a robot 100 will be or is performing its task. Additionally or alternatively, path planning engine 134 may calculate a robot plan with various goals in mind, such as reducing and/or minimizing wear and tear on a robot 100, reducing/minimizing extraneous robot movement (which may pose a danger to nearby persons or objects), minimizing path distance, minimizing path traversal time, and so forth. To this end, in some implementations, path planning engine 134 may be configured to determine a cost that would be incurred, e.g., by a particular robot 100, by a plurality of robots $100_{1-N}$, and/or more generally by a robot system as a whole, for a given path it calculates for a robot.

Environmental mapping engine 136 may be configured to collect and maintain, e.g., in an index 138, records of mapping data received from various sources. These records of mapping data may collectively represent an environment in which robots $100_{1-N}$ operate. These records may include but are not limited to records of architectural details (e.g., walls, stairs, doors, ramps, etc.), static obstacles (furniture, inanimate objects), dynamic obstacles (e.g., people, other robots, moving objects, etc.), and/or hazards (e.g., liquid spills, damaged floors, etc.) present in a robotic environment.

Records of mapping data may be obtained and/or updated from various sources. In some implementations, robots $100_{1-N}$ may utilize various sensors 108 (e.g., cameras, range finders) to observe details of the environment while they perform primary tasks, and may report those observations to environmental mapping engine 136. In some implementations, a user may interact with user interface engine 132 to provide environmental mapping engine 136 with input indicative of newly-discovered or changed architectural details, obstacles, and/or hazards. Records of mapping data in index 138 may be used, e.g., by path planning engine 134, to calculate robot paths and/or costs associated with those paths. Additionally or alternatively, records of obstacles/hazards in index 138 may be used, e.g., by robots $100_{1-N}$, to calculate alternative paths around obstacles/hazards.

In various implementations, robot deployment engine 140 may be configured to selectively deploy one or more robots $100_{1-N}$ to perform various mapping-related sub-tasks while robots $100_{1-N}$ perform their primary tasks. For example, robot deployment engine 140 may selectively deploy a particular robot 100 to deviate from a shortest path traversable by the robot 100 to accomplish a primary task assigned to the robot 100, so that the robot 100 can concurrently map a particular area of interest, e.g., using one or more sensors 108.

Robot deployment engine 140 may selective deploy robots $100_{1-N}$ to perform mapping of an environment in various ways. For example, in some implementations, robot deployment engine 140 may determine a measure of interest in mapping an area of an environment. Robot deployment engine 140 may also determine a cost associated with a robot 100 performing an assigned primary task and an added cost associated with the robot 100 mapping the area of the environment while performing the primary task. Based on this information, robot deployment engine 140 may selectively deploy or not deploy the robot 100 to map the area while performing its assigned primary task.

Robot deployment engine 140 may determine a measure of interest in mapping a particular area of an environment based on various data points, e.g., map data records stored in index 138. In some implementations, a rate at which an area changes may impact a measure of interest in mapping the area. If, e.g., based on records in index 138 it is determined that an area changes often and/or dramatically (e.g., an area of a warehouse that serves as a temporary way station for pallets of inventory), there may be increased incentive (i.e. heightened measure of interest) to map and/or re-map the area. Along similar lines, in some implementations, a measure of uncertainty associated with an area may be correlated to a measure of interest in mapping and/or re-mapping the area, e.g., with a higher measure of uncertainty in the area corresponding to a higher measure of interest in mapping the area. A measure of interest in mapping an area may be additionally or alternatively determined based on other signals, such as an amount of time since the area has been mapped (e.g., even an area with a low rate of change may be of interest if the area has not been mapped in a long time), a value of inventory and/or equipment in the area, and so forth. For example, a greater amount of time since an area has been mapped may correspond to a greater measure of interest in mapping the area.

In various implementations, a measure of data connectivity between one or more robots $100_{1-N}$ and robot management system 130 via one or more channels 128 while the one or more robots $100_{1-N}$ operate in an area may be considered when determining a measure of interest in mapping the area. In some implementations, a measure of data connectivity in an area may be inversely related to a measure of interest in mapping the area. For example, if Wi-Fi is weak and/or unreliable in a particular region of a warehouse, there may be incentive to gather as detailed and/or up-to-date map data about the region as possible. That way, robots $100_{1-N}$ operating in that region with unreliable data connectivity may still have sufficient information about the region to operate relatively autonomously. Accordingly, such a region may be associated with a relatively high measure of interest in mapping and/or re-mapping.

Path planning engine 134 may calculate an added cost associated with a robot 100 mapping an area of an environment while performing its primary task in a variety of ways based on a variety of data points. In some implementations, the added cost may be determined based at least in part on one or more attributes of the robot 100 in question. For example, the added cost for a highly-critical robot (e.g., a robot for which downtime would be especially costly or otherwise detrimental) to map an area while it performs a primary task may be higher than the added cost for a less-critical robot to perform the mapping. Or, the more in demand a robot is, the higher the added cost may be for that robot to perform mapping on the side while it performs its primary task. Additionally or alternatively, measures of importance and/or time-sensitivity of the robot's primary task may be considered to determine an added cost for the robot to perform mapping simultaneously. For instance, the greater the importance of a primary task, the higher the added cost of mapping while performing that task. Additionally or alternatively, an impact having to map the area will have on a robot's ability to perform a subsequent task may be considered as part of the added cost.

Once an added cost for a robot 100 to map an area while performing a primary task is determined, it may then be determined whether the added cost is justified. In some implementations, quantitative measures of the added cost and interest in mapping an area may be compared, e.g., after being normalized. In some implementations, if the normalized added cost is greater than the normalized measure of interest in mapping the area, then the robot 100 may be deployed to perform its primary task only. If the normalized added cost is less than the normalized measure of interest, on the other hand, then the robot 100 may be deployed to map the area of interest while also performing its primary task. Additionally or alternatively, an absolute cost for mapping an area while also performing a primary task (e.g., cost to perform the primary task plus added cost to map the area) may be compared to a threshold. Additionally or alternatively, a measure of interest in mapping an area may be used to calculate an added cost threshold, and added cost may then be compared to the threshold to determine whether to deploy a robot to perform mapping while it performs its primary task.

While the components of robots $100_{1-N}$ and robot management system 130 are depicted separately in FIG. 1, this is not meant to be limiting. In various implementations, one or components of a robot 100 may be implemented in whole or in part on robot management system 130, and one or more components of robot management system 130 may be implemented in whole or in part on a robot 100. For example, while path planning engine 134 is depicted on robot management system 130, in some implementations, it may be implemented in part on robot 100. For example, a global path planning engine may be implemented on robot management system 130 to provide high level (e.g., low resolution or "coarse") influence on robots $100_{1-N}$. This influence may be based on the more extensive knowledge robot management system 130 may have about the environment. Meanwhile, each robot may be equipped with a local path planner to make higher resolution and/or more granular decisions in response to local stimuli. Additionally or alternatively robot deployment engine 140 may be implemented in whole or in part on a robot 100. In such a scenario, the robot 100 may determine (e.g., receive from robot management system 130) a measure of interest in mapping an area, and then determine on its own whether it should map the area while performing a task that has been assigned to it.

Figure 2:
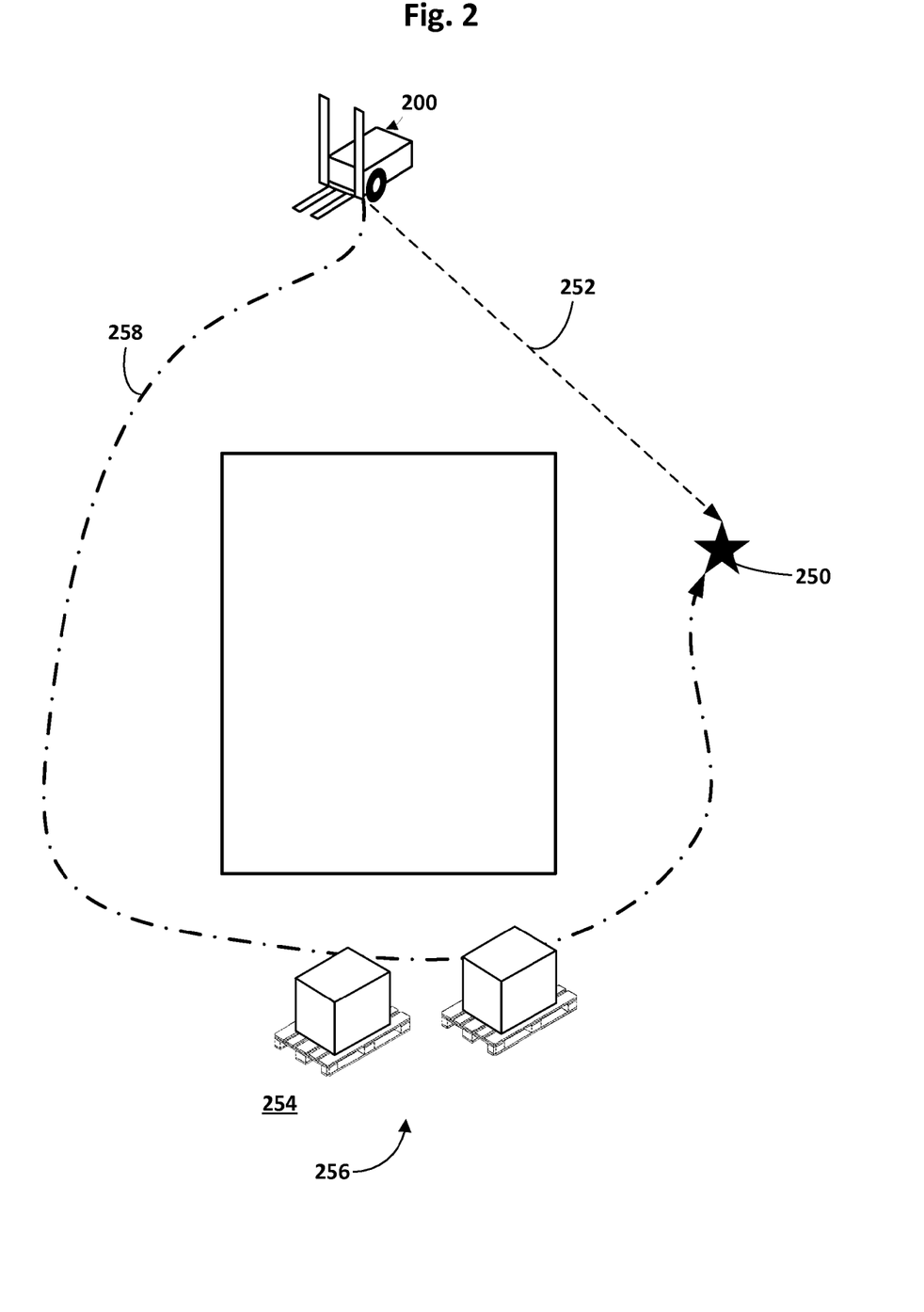
FIGS. 2-5 schematically depict examples of how robots may be selectively deployed to map areas of interest using techniques described herein, in accordance with various implementations.

Referring now to FIG. 2, an example robot 200 in the form of a robot forklift is depicted operating in a warehouse environment. Robot 200 may be assigned a primary task that requires it to travel to destination 250. Robot management system 130 has calculated a default path 252 that constitutes the shortest and/or most direct route for robot 200 to traverse to destination 250. However, robot management system 130, e.g., by way of environmental mapping engine 136, may determine that there is a measure of interest in mapping a particular area 254 of the environment. For example, area 254 may be considered to have a relatively high rate of change because it may serve as a way station at which pallets 256 loaded with inventory are placed temporarily.

Robot management system 130, e.g., by way of path planning engine 134, may calculate an alternative path 258 that passes through or by area 254 before it reaches destination 250. In some implementations, path planning engine 134 may calculate a cost for traversing the default path 252 and a cost for traversing the alternative path 258. A difference between the two costs may be considered an added cost for robot 200 to map area 254 while it performs its primary task (which requires robot 200 to travel to destination 250). Robot deployment engine 140 may then determine whether the added cost is justified by the measure of interest in mapping area 254. If the answer is yes, then robot deployment engine 140 may deploy robot 200 along alternative path 258. If the answer is no, then robot deployment engine 140 may deploy robot 200 along default path 252.

Figure 3:
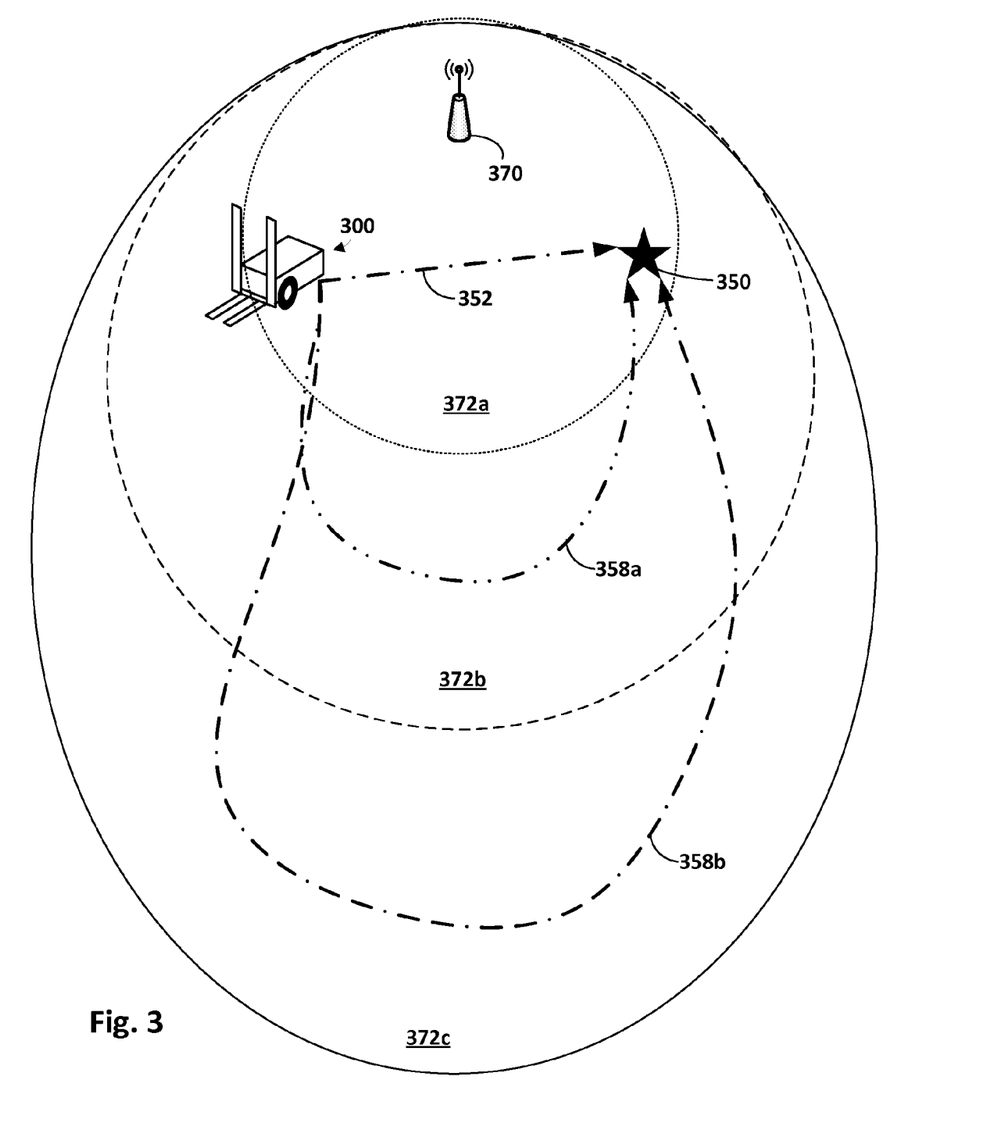

In FIG. 3, another robot 300 (once again in the form of a forklift robot) may be assigned a task that requires it to travel to destination 350. In this example, robot 300 is in communication with a robot management system (e.g., 130) via a wireless access point 370. Wireless access point 370 may facilitate various types of wireless communication between robot 300 and a robot management system, such as Wi-Fi, Bluetooth, WiMAX, cellular, a propriety wireless protocol, and so forth. Wireless access point 370 may provide a wireless signal that becomes weaker the farther a receiver (e.g., robot 300) travels from wireless access point 370. In FIG. 3, for example, a first region 372a may have a relatively strong wireless signal because it is proximate wireless access point 370. A second region 372b may have a somewhat weaker signal because it is further from wireless access point 370. A third region 372c farthest from wireless access point 370 may have an even weaker signal still, and in some cases may be weak enough to be considered unreliable.

Because the wireless signal is so unreliable in third region 372c, it may be desirable or necessary for robot 300 to be able to operate within third region 372c with a relatively high amount of autonomy, because it cannot rely on robot management system 130 to provide detailed paths, plans, or instructions in real time. Accordingly, environmental mapping engine 136 may calculate a relatively high measure of interest in mapping third region 372c. The same principle may apply to second region 372b, except not as acutely, because the wireless signal is stronger in second region 372b than in third region 372c. Thus, robot management system 130 may calculate two measures of interest, one for interest in mapping second region 372b and another for interest in mapping third region 372c.

In FIG. 3, robot management system 130, e.g., by way of path planning engine 134, has planned two alternative paths, 358a and 358b, that robot 300 may traverse instead of default path 352. First alternative path 358a passes through second region 372b with the intermediate wireless signal. Second alternative path 358b passes through third region 372c with the unreliable wireless signal. To determine which path (352, 358b, 358c) robot 300 should traverse, robot management system 130, e.g., by way of path planning engine 134, may calculate a cost associated with traversing default path 352. From this cost data, robot management system 130, e.g., by way of path planning engine 134 and/or environmental mapping engine 136, may then determine the added cost associated with robot 300 traversing first alternative path 358a versus default path 352. Likewise, robot management system 130, e.g., by way of path planning engine 134 and/or environmental mapping engine 136, may determine the added cost associated with robot 300 traversing second alternative path 358b versus default path 352.

If the added cost for traversing first alternative path 358a is justified by the measure of interest in mapping second region 372b, then robot 300 may be deployed to traverse first alternative path 358a to destination 350. If the added cost for traversing second alternative path 358b is justified by the measure of interest in mapping third region 372c, then robot 300 may be deployed to traverse second alternative path 358b to destination 350. In the event that the added cost for both alternative paths 358a and 358b is justified by respective measures of interest in mapping second and third regions 372b and 372c, then the added costs and/or measures of interest may be compared to each other to select the best alternative path. For example, the alternative path for which the added cost is more greatly outweighed by the respective measure of interest may be selected.

Figure 4:
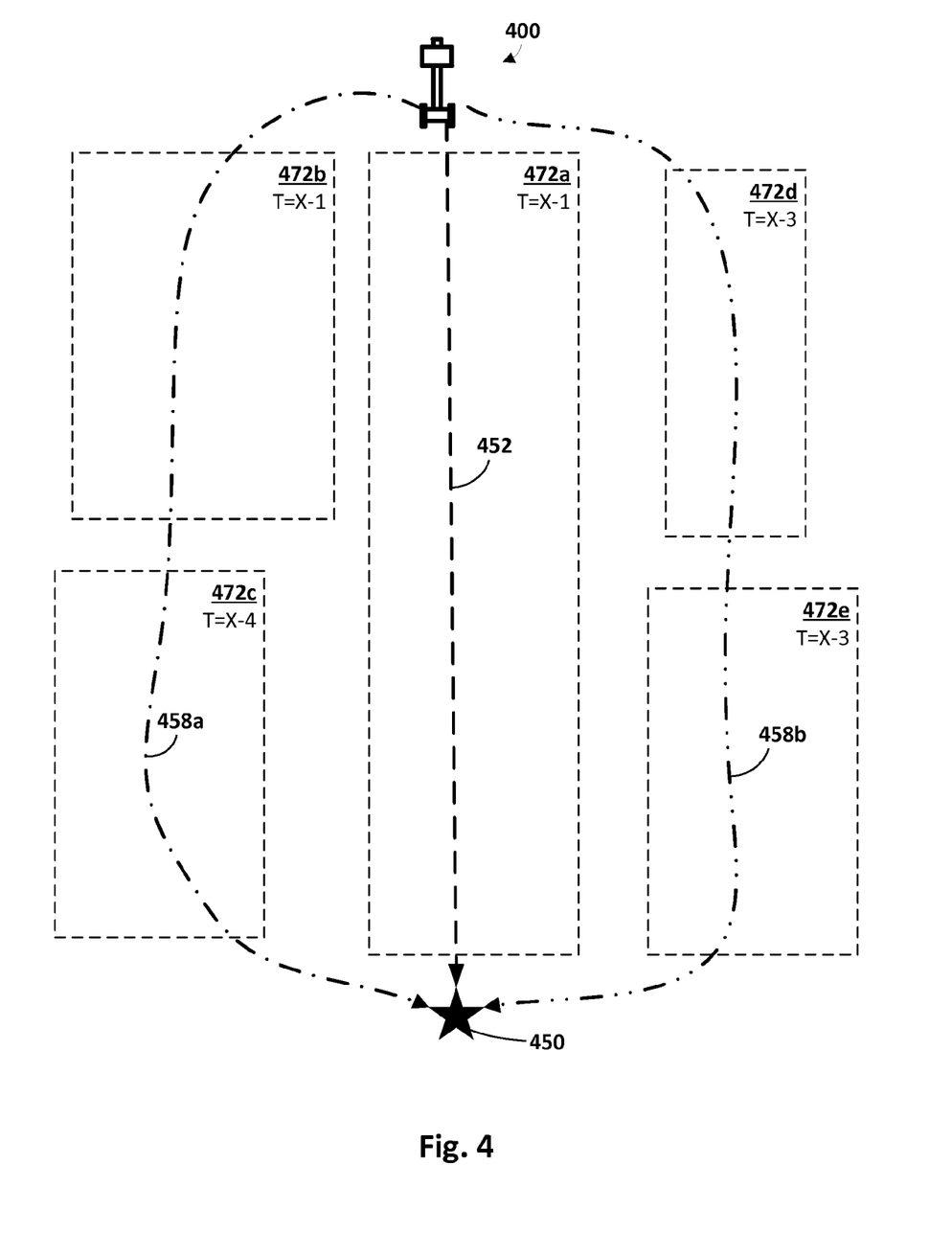

As noted above, in some implementations, a measure of interest in mapping an area may be determined based on an amount of time since the area was mapped. FIG. 4 depicts an example in which a plurality of areas 472a-e are defined in an environment based on an amount of time since the areas were last mapped. First area 472a was mapped most recently, at X−1 units of time in the past. "Time units" may refer to any unit of time, such as seconds, minutes, hours, days, weeks, months, arbitrarily-defined time intervals, etc. Second area 472b was also mapped X−1 units of time in the past. Third area 472c was mapped X−4 units of time in the past. Fourth area 472d and fifth area 472e were each mapped X−3 units of time in the past.

In this example, a robot 400 (this time in the form of a telepresence robot) has been assigned a primary task that requires it to travel to destination 450. A default shortest path 452 has been calculated, e.g., by path planning engine 134, for robot 400 to traverse to destination 450. Default path 452 passes through first region 472a. A first alternative path 458a has been calculated, e.g., by path planning engine 134, that would take robot 400 through second region 472b and third region 472c. A second alternative path 458b has been calculated, e.g., by path planning engine 134, that would take robot 400 through fourth region 472d and fifth region 472e.

Suppose that a measure of interest in mapping each region is proportionate to the time passed since it was last mapped.

Suppose further that the added cost associated with traversing robot 400 along first alternative path 458a or second alternative path 458b is relatively modest. In such a scenario, the path robot 400 takes may depend largely on how measures of interest in mapping the various regions 472a-e are considered in relation to one another.

A measure of interest in mapping first region 472a may be relatively low because it was mapped relatively recently (X–1 time units in the past). Similarly, a measure of interest in mapping second region 472b may be relatively low in isolation because it was mapped relatively recently (X–1 time units in the past). However, the calculated alternative path 458a that passes through second region 472b also passes through third region 472c, which may have a relatively high measure of interest because it has not been mapped for some time (X–4 time units in the past). Accordingly, between default path 452 and first alterative path 458a (and assuming the added cost to traverse first alternative path 458a is not prohibitive), first alternative path 458a may be selected for traversal by robot 400, so that it can map second region 472b and third region 472c. Measures of interest in mapping fourth region 472d and fifth region 472e may be relatively high because each was last mapped X–3 time units ago. Accordingly, between default path 452 and second alterative path 458b (and assuming the added cost to traverse second alternative path 458b is not prohibitive), second alternative path 458b may be selected.

Choosing between default path 452 on the one hand and either first alternative path 458a or second alternative path 458c on the other hand may be relatively straightforward. However, choosing between first alternative path 458a and second alternative path 458b may be more complicated. In some implementations, robot deployment engine 140 may select the alternative path that passes through the single region with the absolute highest measure of interest. In FIG. 4, such a strategy would lead robot 400 to traverse first alternative path 458a so that it passes through third region 472c, which has the highest absolute measure of interest because the most time has elapsed since it was last mapped. In other implementations, robot deployment engine 140 may select the path that passes through a multiple regions having the highest net measure of interest. In FIG. 4, such a strategy would lead robot 400 to traverse second alternative path 458b so that it passes through fourth region 472d and fifth region 472e, which together have a net measure of interest of six (as opposed to second region 472b and third region 472c, which together have a net measure of interest of five).

Figure 5:
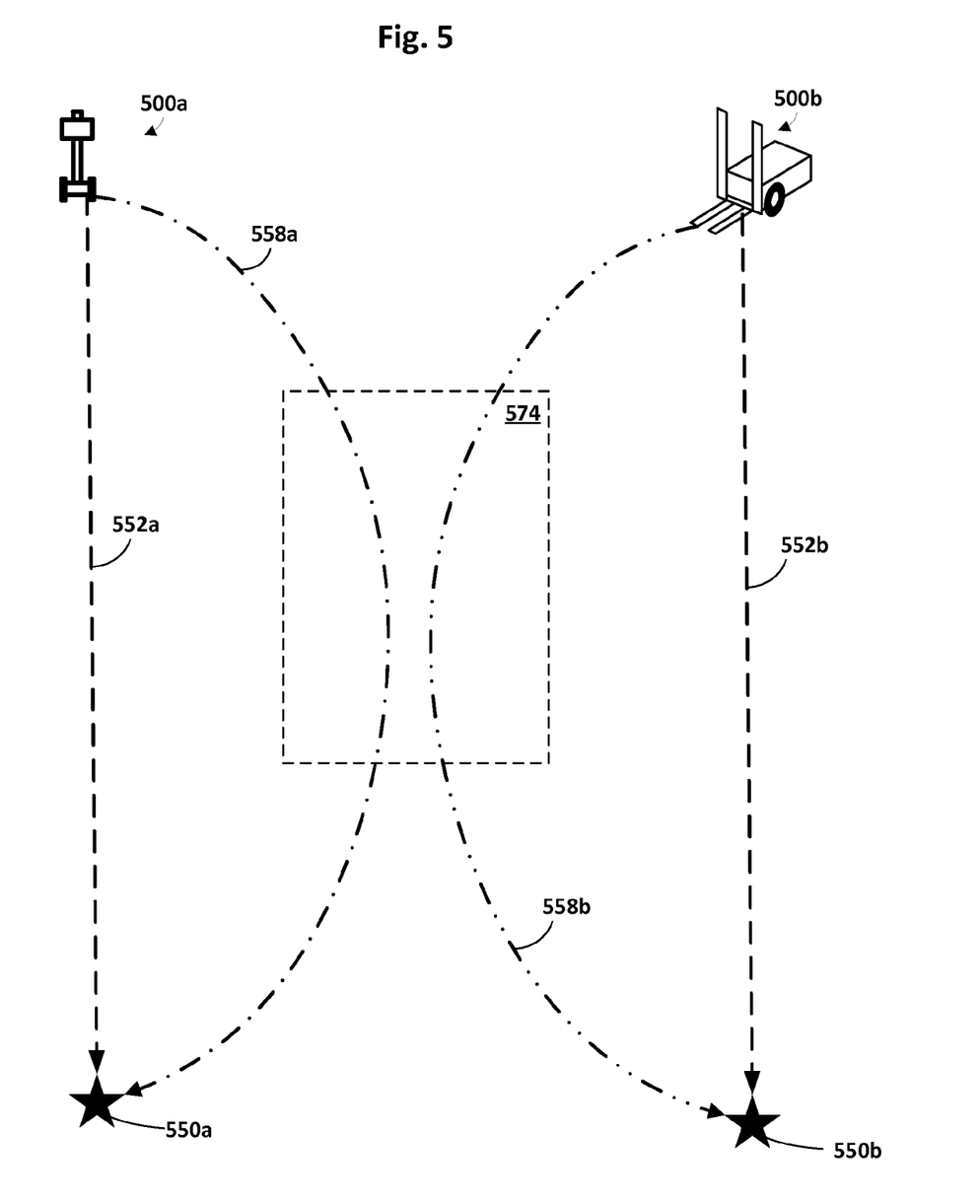

In addition to the various data points and other considerations described previously, in some implementations, robot management system 130 may consider various attributes of multiple robots to determine which of the multiple robots to deploy to map an area of interest. Referring to FIG. 5, two robots, 500a (in the form of a telepresence robot) and 500b (in the form of a forklift robot) are depicted. First robot 500a has been assigned a task that requires it to travel to first destination 550a. A first default path 552a (e.g., shortest path) has been calculated for first robot 500a to traverse to first destination 550a. Second robot 500b has been assigned a task that requires it to travel to second destination 550b. A second default path 552b (e.g., shortest path) has been calculated for second robot 500b to traverse to second destination 550b.

Suppose a measure of interest in mapping an area 572 has been calculated, e.g., using one or more of the data points and/or techniques described previously. A first alternative path 558a for first robot 500a to traverse so that it can map area 572 on its way to first destination 550a has been calculated. Likewise, a second alternative path 558b for second robot 500b to traverse so that it can map area 572 on its way to second destination 550b has been calculated.

Robot management system 130, e.g., by way of path planning engine 134, may calculate an added cost for first robot 500a to traverse first alternative path 558a, as opposed to first default path 552a. Likewise, robot management system 130, e.g., by way of path planning engine 134, may calculate an added cost for second robot 500b to traverse second alternative path 558b, as opposed to second default path 552b. Calculation of these added costs may take into consideration one or more aspects of robots 500a-b.

For example, suppose FIG. 5 represents a warehouse environment. In such a scenario, second robot 500b may typically be considered more "important," to have a higher measure of "criticality," and/or to be more "in demand" than first robot 500a (unless the warehouse is not particularly busy). In such case, the added cost for deploying second robot 500b along second alternative path 558b may be relatively high, e.g., because it may be needed for subsequent warehouse tasks. On the other hand, if first robot 500a is a telepresence robot that is travelling to first destination 550a so that it can be commandeered by someone of importance, such as a safety inspector, then it may be considered more critical and/or in demand than second robot 500b, or its task (traveling to destination to be commandeered by the inspector) may be considered relatively important. In such case, the added cost of diverting first robot 500a along first alternative path 558a may be relatively high.

Another aspect of robots 500a and 500b that may be considered in calculating added cost is a cost to operate each robot. For example, a relatively small, light, and/or nimble robot may be preferable for mapping an area than a relatively heavy robot that is expensive to operate. Another aspect of robots 500a and 500b that may be considered is a cost and/or fragility of each robot. If a telepresence robot such as 500a is less expensive than a forklift robot such as 500b, the added cost of deploying the telepresence robot to map area 572 may be lower. Another attribute of robots 500a and 500b that may be considered in calculating added cost is power available to each robot. For example, the added cost to divert a robot with low battery may be higher than diverting a well-powered robot, especially if the first robot is scheduled to hook up to a charging station soon.

Once robot management system 130 has calculated the added costs for robots 500a and 500b to traverse their respective alternative paths (558a and 558b), then robot management system may select one or the other to traverse its respective alternative path through area 572 to perform mapping. If the added cost to divert either robot along its respective alternative path is justified by the measure of interest in mapping area 572, then the two added costs may be compared and one robot may be selected to be diverted along its alternative path based on the comparison. Or, if the measure of interest in mapping are 572 is sufficiently high, and no collisions would result, then both robots 500a and 500b may be deployed to map area 572 while performing their respective primary tasks.

Figure 6:
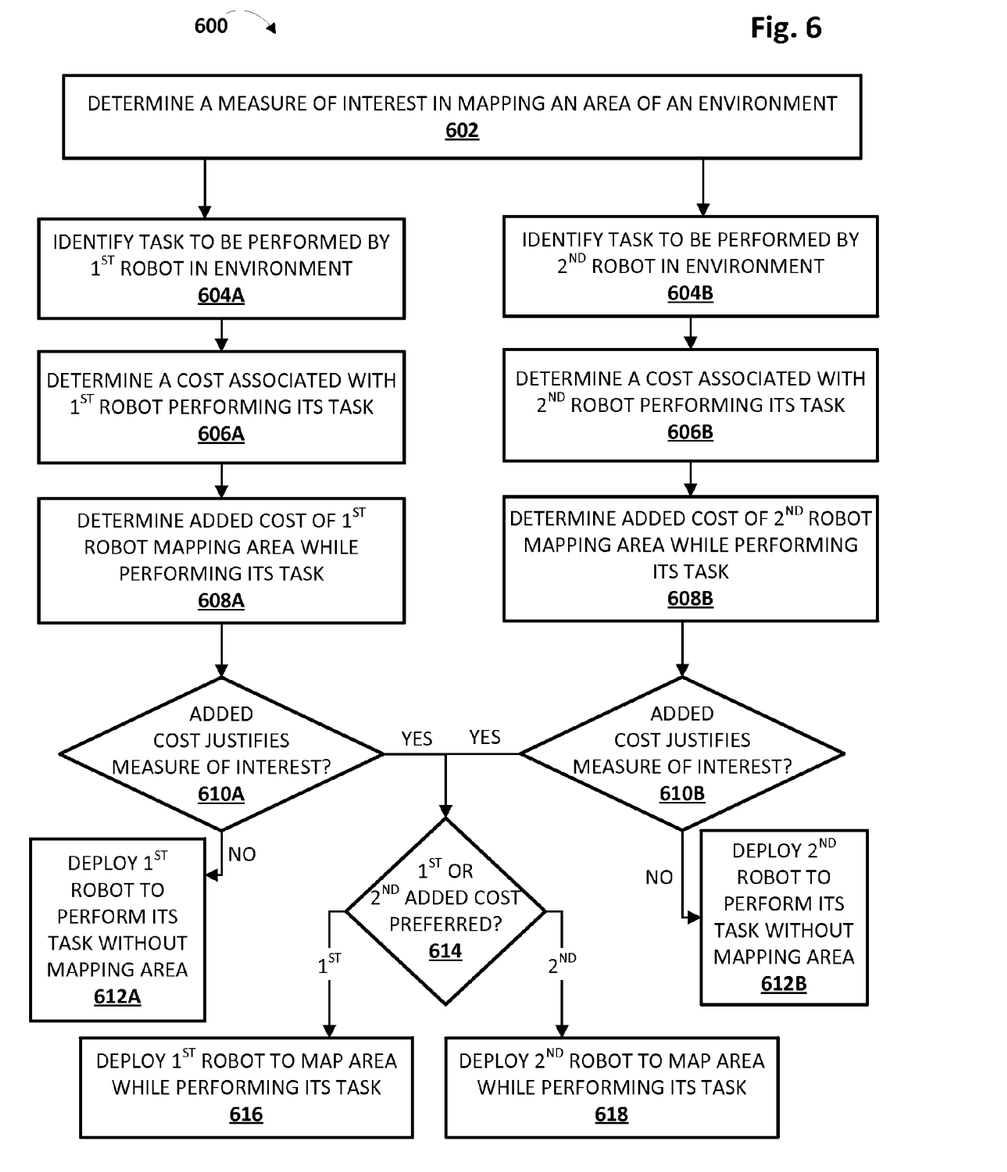
FIG. 6 depicts an example method, in accordance with various implementations.

Referring now to FIG. 6, an example method 600 of selectively deploying robots to performing mapping in conjunction with performing primary tasks is depicted. For convenience, the operations of flow charts are described with reference to a system that performs the operations. This system may include various components of various computer systems, including elements of robot 100 and/or robot management system 130. Moreover, while operations of method 600 are shown in a particular order, this is not meant to be limiting. One or more operations may be reordered, omitted, or added.

At block 602, the system may determine a measure of interest in mapping a particular area of an environment, e.g., as discussed previously. In some implementations, robot management system 130 may calculate the measure of interest, e.g., by way of environmental mapping engine 136 running calculations based on records in index 138. In some implementations, robot management system 130, e.g., by way of user interface engine 132, may receive a manually-input measure of interest, e.g., from a user or another computing system, or even from a robot. Once the measure of interest is determined, in some implementations, robot management system 130 may then perform one or more of the remaining operations of method 600 itself, and deploy a robot based on the results. In other implementations, robot management system 130 may provide the calculated measure of interest to one or more robots, and the robots may themselves perform one or more of the remaining operations of method 600.

At blocks 604A and B, the system may identify respective tasks to be performed by a first robot and a second robot in an environment. Operations 604A and 604B (and other operations downstream) are depicted in parallel in FIG. 6, which suggests that these operations are calculated in parallel. However, this is not meant to be limiting, and in various implementations, various operations of method 600 that are depicted in parallel may alternatively be performed in series, or in any combination of in parallel and/or in series.

At blocks 606A and B, the system may determine costs associated with the first robot performing its task and the second robot performing its task, respectively. At blocks 608A and B, the system may determine respective added costs associated with the first robot mapping the area while performing its task and the second robot mapping the area while performing its task. At blocks 610A and B, the system may compare the respective added costs calculated at blocks 608A and B to the measure of interest determined at block 602. If the answer at one of blocks 610A and 610B is no, then method 600 may proceed to a respective block 612A or 612B, in which case that respective robot will be deployed to perform its task without mapping the area.

If the answer at both blocks 610A and 610B is yes, then method 600 may proceed to block 614. At block 614, the system may compare the added costs associated with the first and second robots mapping the area while performing their respective tasks to see which added cost is preferred. Techniques for selecting one added cost or the other were described previously, and may include selecting the lower added cost, the lowest absolute cost (e.g., cost for a robot to perform its task plus added cost to map), and so forth. If the added cost for the first robot to map the area is preferred, then method 600 may proceed to block 616, and the first robot may be deployed to map the area while performing its task. If the added cost for the second robot to map the area is preferred, then method 600 may proceed to block 618, and the second robot may be deployed to map the area while performing its task. While not depicted in FIG. 6, in some implementations, both robots may be deployed to map the area, e.g., to obtain even more comprehensive mapping data. This may occur, for instance, if the measure of interest in mapping the area satisfies a particularly high interest threshold.

Figure 7:
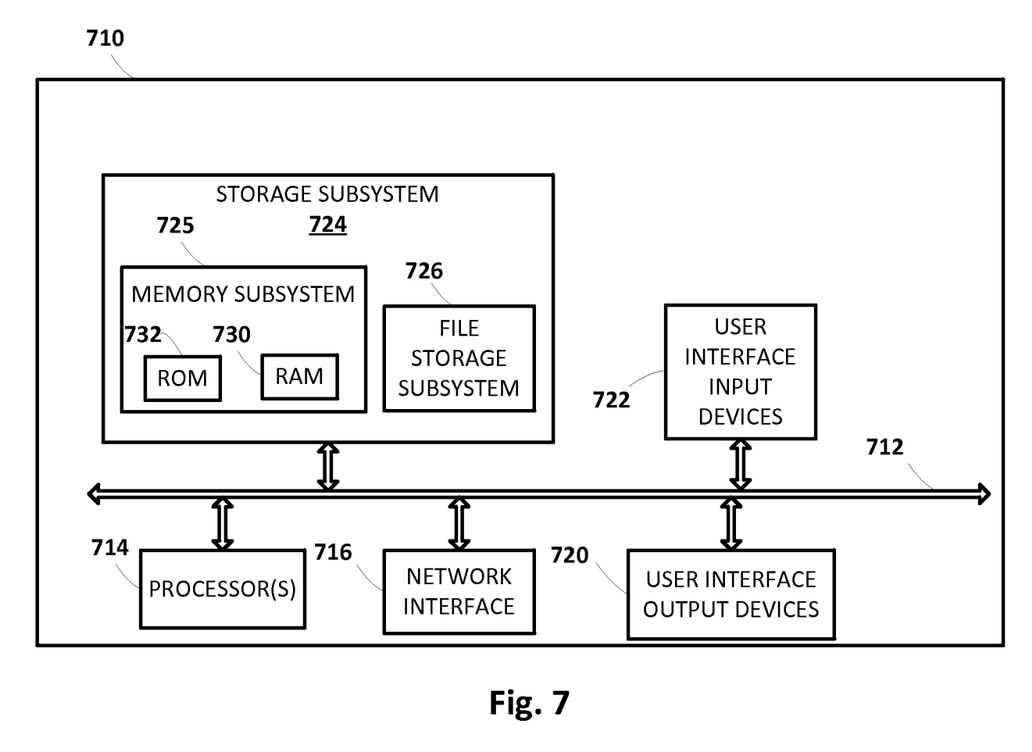
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 410. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600, and/or to implement one or more aspects of robot 100 and/or robot management system 130. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of selectively deploying a robot, comprising:
determining, by one or more processors, a measure of interest in mapping an area of an environment;
determining, by one or more of the processors, a first path that is traversable by the robot while performing a task, wherein the first path does not pass through the area of the environment;
determining, by one or more of the processors, an added cost associated with the robot traversing a second path that passes through the area of the environment and mapping the area of the environment while performing the task;
comparing, by one or more of the processors, the added cost to the measure of interest; and
selectively deploying, by one or more of the processors, the robot to traverse the first path while performing the task or to traverse the second path and map the area while performing the task based on the comparing.

2. The method of claim 1, wherein determining the measure of interest comprises determining a rate of change of the area, wherein a greater rate of change of the area corresponds to a greater measure of interest in mapping the area.

3. The method of claim 1, wherein determining the measure of interest comprises determining a measure of uncertainty about the area, wherein a greater measure of uncertainty corresponds to a greater measure of interest in mapping the area.

4. The method of claim 1, wherein determining the measure of interest comprises determining how recently the area has been mapped, wherein a greater amount of time since the area has been mapped corresponds to a greater measure of interest in mapping the area.

5. The method of claim 1, wherein determining the measure of interest comprises determining a measure of data connectivity in the area, wherein the measure of data connectivity is inversely related to the measure of interest in mapping the area.

6. The method of claim 1, wherein the added cost is determined based at least in part on one or more attributes of the robot.

7. The method of claim 6, wherein the one or more attributes of the robot comprise a measure of criticality associated with the robot.

8. The method of claim 6, wherein the one or more attributes of the robot comprise a measure of demand associated with the robot.

9. The method of claim 1, wherein the added cost is determined based at least in part on a measure of importance associated with the task.

10. The method of claim 1, wherein the added cost is determined based at least in part on an impact that mapping the area will have on a subsequent task assigned to the robot.

11. The method of claim 1, wherein the robot is a first robot, the task is a first task, the added cost is a first added cost, and the method further includes:
determining, by one or more of the processors, a third path that is traversable by a second robot while performing a second task, wherein the third path does not pass through the area of the environment;
determining, by one or more of the processors, a second added cost associated with the second robot traversing a fourth path that passes through the area of the environment and mapping the area of the environment while performing the second task;
comparing, by one or more of the processors, the first added cost to the second added cost; and
selectively deploying, by one or more of the processors, the first or second robot to map the area based on a result of the comparing the first added cost to the second added cost.

12. A robot management system comprising memory and one or more processors operable to execute instructions stored in the memory, comprising instructions to:
determine a measure of interest in mapping an area of an environment;
determine a first path that is traversable by a robot while performing a task, wherein the first path does not pass through the area of the environment;
determine an added cost associated with the robot traversing a second path that passes through the area of the environment and mapping the area of the environment while performing the task;
compare the added cost to the measure of interest; and
selectively deploy the robot to traverse the first path while performing the task or to traverse the second path and map the area while performing the task based on the comparing.

13. The system of claim 12, wherein the measure of interest is based on a rate of change of the area, wherein a greater rate of change of the area corresponds to a greater measure of interest in mapping the area.

14. The system of claim 12, wherein the measure of interest is based on a measure of uncertainty about the area, wherein a greater measure of uncertainty corresponds to a greater measure of interest in mapping the area.

15. The system of claim 12, wherein a the measure of interest is based on how recently the area has been mapped, wherein a greater amount of time since the area has been mapped corresponds to a greater measure of interest in mapping the area.

16. The system of claim 12, wherein the measure of interest is based on a measure of data connectivity in the area, wherein the measure of data connectivity is inversely related to the measure of interest in mapping the area.

17. The system of claim 12, wherein the added cost is determined based at least in part on one or more attributes of the robot.

18. The system of claim 17, wherein the one or more attributes of the robot comprise a measure of criticality or a measure of demand associated with the robot.

19. The system of claim 12, wherein the robot is a first robot, the task is a first task, the added cost is a first added cost, and the system further comprises instructions to:
- determine a third path that is traversable by a second robot performing a second task, wherein the third path does not pass through the area of the environment;
- determine a second added cost associated with the second robot traversing a fourth path that passes through the area of the environment and mapping the area of the environment while performing the second task;
- compare the first added cost to the second added cost; and
- selectively deploy the first or second robot to map the area based on a result of the comparison of the first added cost to the second added cost.

20. At least one non-transitory computer-readable medium comprising instructions that, in response to execution of the instructions by one or more processors, cause one or more of the processors to perform the following operations:
- determining a measure of interest in mapping an area of an environment;
- determining a first path that is traversable by a robot while performing a task, wherein the first path does not pass through the area of the environment;
- determining an added cost associated with the robot traversing a second path that passes through the area of the environment and mapping the area of the environment while performing the task;
- comparing the added cost to the measure of interest; and
- selectively deploying the robot to traverse the first path while performing the task or to traverse the second path and map the area while performing the task based on the comparing.

* * * * *